SYSTEM FOR PRECISELY CONTROLLING AMOUNT OF ANGULAR ROTATION OR LINEAR MOVEMENT

Filed March 6, 1963

INVENTOR

EARL R. KREINBERG

BY

Robert D. Sanborn

ATTORNEY 3,280,399

SYSTEM FOR PRECISELY CONTROLLING AMOUNT OF ANGULAR ROTATION OR LINEAR MOVEMENT

Earl R. Kreinberg, Harrisburg, Pa., assignor to Philco Corporation, Philadelphia, Pa., a corporation of Delaware Filed Mar. 6, 1963, Ser. No. 263,302
13 Claims. (Cl. 318—171)

Figures 1, 2:
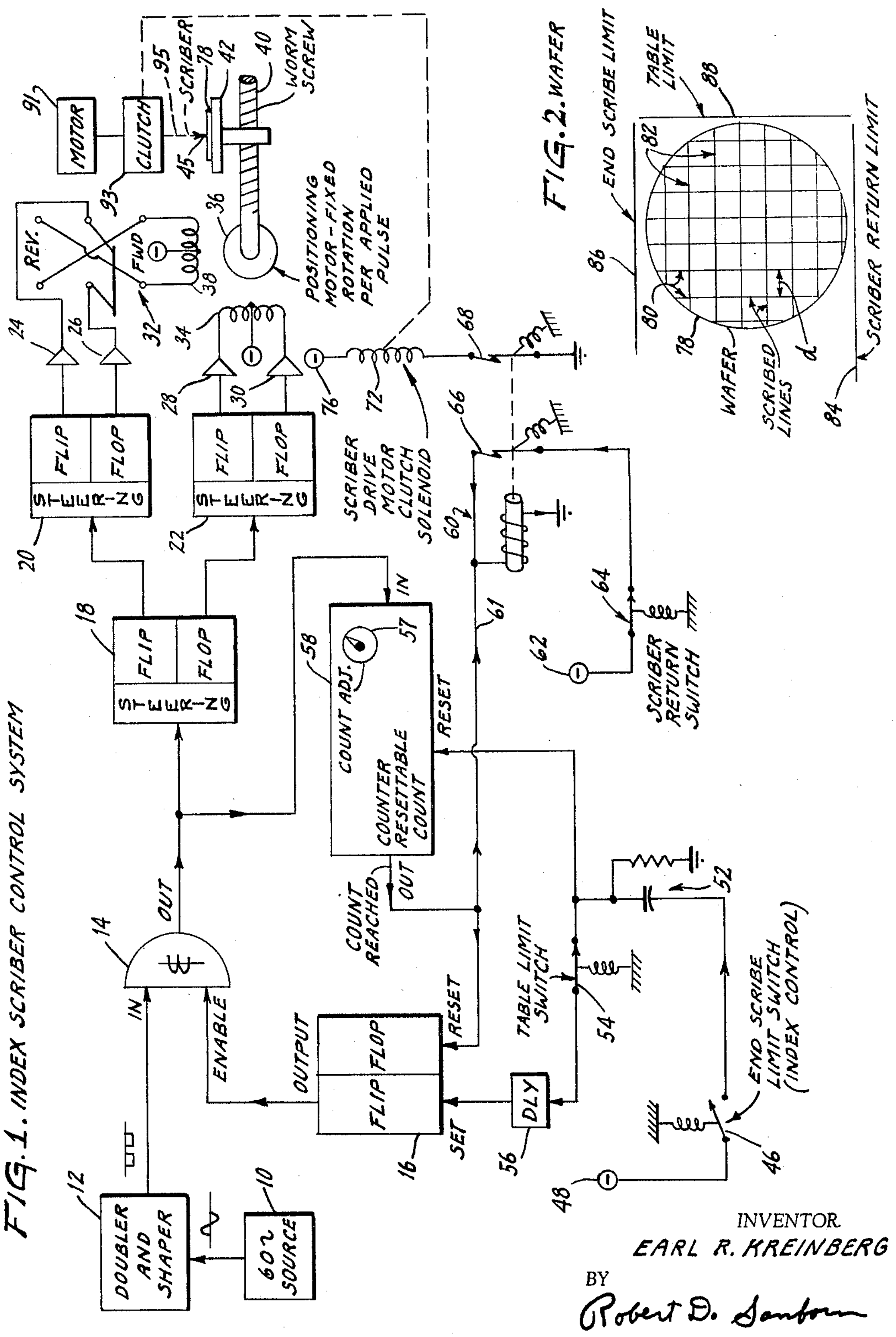

This invention relates to control circuitry and more particularly to circuitry for precisely controlling the number of degrees of an angular rotation or the distance of a linear movement.

The invention will be shown and described for exemplary purposes as the electronic indexing control unit of a machine for scribing index lines on semiconductor wafers, but it is to be understood that the invention is in nowise limited to this application; it is suitable for use in any application where the magnitude of a mechanical excursion is to be precisely controlled.

In the fabrication of semiconductor devices (e.g., mesa transistors), several hundred or several thousand transistors are usually formed on a single semiconductor wafer simultaneously. This wafer must then be separated into many pieces or "dice," each piece including a single transistor. It is most convenient to do this by scribing a gridwork of lines on the wafer between the individual transistors, and then fracturing the wafer according to the previously scribed lines.

Heretofore, as illustrated, for example, in Patent 2,970,-730 to F. W. Schwarz, granted February 7, 1961, this gridwork of lines was scribed manually. A scribing tool was manually positioned with the aid of a microscope between adjacent rows of transistors and then drawn across the wafer to produce a groove therein. The tool was then manually repositioned between the next two adjacent rows, again with the aid of the microscope, and a second groove, parallel to the first, was scribed. This process was continued until the entire wafer was scribed. The wafer was then rotated 90°, and a set of perpendicular grooves was scribed. This process is obviously unduly time consuming and subject to human errors because of the great number of repetitive accurate positioning movements required.

Since the distance between adjacent rows of transistors is fixed, it would be desirable if automatic means were available to move the scribing tool a fixed increment, equal to the distance between adjacent rows, after each time the scribing tool had completed a groove. In this way the scribing tool would only have to be manually positioned once where the first groove was to be located. Human errors would be eliminated, and the entire wafer would be completely scribed in a far shorter time.

*Objects*

Accordingly several objects of the invention are:

(1) To provide apparatus for electronically effecting a precisely measured mechanical movement.

(2) To automatically effect repetitive precisely measured mechanical increments of motion.

(3) To provide electronic control apparatus for indexing parallel scribed lines on semiconductor wafers.

Other objects and advantages of the invention will be apparent from a consideration of the following summary and description thereof.

*Summary*

According to the present invention, a mechanical movement whose distance is to be precisely regulated is controlled by means of a synchronous motor which turns a precise number of rotational degrees for each pulse applied thereto. A counter is arranged to count the pulses supplied to the motor and block further pulses thereto after a predetermined number have been supplied.

*Drawing*

FIG. 1 of the drawing shows in symbolic form the elements of a scriber indexing system according to the invention.

FIG. 2 shows a wafer including lines scribed thereon by apparatus of the invention.

*Description*

In FIG. 1, 60 cycle source 10 may comprise a step-down transformer energized from a standard line voltage source and arranged to supply a 60 cycle signal of about 10–20 volts amplitude to doubler and shaper 12.

Doubler and shaper 12 is a circuit which will produce uniformly spaced and shaped pulses at a 120 cycle rate in response to the 60 cycle signal supplied by source 10. Circuit 12 may comprise, for example, a full wave rectifier for obtaining a 120 cycle signal from the 60 cycle input signal, and a Schmitt trigger circuit followed by a differentiator for converting the full wave rectified signal into fixed-amplitude, uniformly-spaced pulses.

The pulse signals supplied by circuit 12 are supplied in parallel by way of AND gate 14 to the input of presettable counter 58 and complementing flip-flop 18. Flip-flop 18 is a conventional flip-flop circuit provided with a steering gate so that the outputs thereof will be alternately energized in response to the train of pulses supplied by AND gate 14. AND gate 14 is a conventional two-input AND gate which will pass a signal from its "IN" to its "OUT" terminal when its "ENABLE" terminal is supplied with a negative direct voltage.

Each output of flip-flop 18 drives a respective one of two similar flip-flops 20 and 22. The two outputs of flip-flop 20 energize one winding 38 of a two-phase positioning motor 36. This energization takes place by way of amplifiers 24 and 26 and reversing switch 32. That is, in a preferred embodiment of the invention, the center tap of winding 38 is maintained at a suitable negative potential. The right-half of winding 38 forms the collector load impedance for the final transistor amplifier stage of amplifier 24 when switch 32 is placed in its "forward" position. If switch 32 is in its "reverse" position the right-half of winding 38 forms the collector load impedance for the final stage of amplifier 26. Similarly the left-half of winding 38 forms the load impedance for the final stage of amplifier 26 or 24. A second winding 34 of motor 36 is energized in similar fashion by the two outputs of flip-flop 22 by way of amplifiers 28 and 30.

It will thus be seen that due to the cumulated frequency dividing effect of flip-flops 18 and 20, a 30 cycle alternating current will flow in winding 38 in response to the 120 cycle pulses supplied to flip-flop 18. The number of cycles of this 30 cycle signal supplied to winding 38 is determined by the number of 120 cycle pulses supplied by AND gate 14 to flip-flop 18. A similar 30 cycle signal will flow in winding 34.

Motor 36 may be a synchronous motor on which windings 34 and 38 are oriented. Motor 36 is of the type which rotates a precise number of degrees per applied pulse, e.g., 1.8°/pulse in one embodiment. Such stepping operation can be obtained when the number of stator coils approximates, but is unequal to the number of rotor teeth on the motor, as will be appreciated by those skilled in the art. Such motors may currently be obtained, for example, from the Superior Electric Co. under the trade name "SLO-SYN."

Motor 36 is mechanically coupled to a worm screw 40 which in turn controls the position of work table 42.

The number of pulses supplied to flip-flop 18 from doubler and shaper 12 is controlled by counter 58 and AND gate 14. Counter 58 may be a conventional decade counter provided with a control 57 which may be manually set to select the number of pulses which must be supplied to its "IN" connection to cause a negative output voltage to appear at its "OUT" connection. The counter is readied for operation by applying a negative pulse to its "RESET" input.

The output of counter 58 is connected to the "RESET" input of a standard flip-flop circuit 16. The single output of flip-flop 16, which is connected to the ENABLE input of gate 14, will supply a negative direct voltage if its "SET" input is pulsed. The negative voltage provided by flip-flop 16 will be terminated when the RESET input of flip-flop 16 is energized.

The RESET input of counter 58 is energized from source 48 by way of limit switch 46 and resistor-capacitor coupling circuit 52. As will be explained in more detail presently, switch 46 is normally open, but is closed momentarily each time a cyclically operating diamond scribing tool 45 reaches one extremity of its excursion. Switch 46 may also be manually actuated.

The SET input of flip-flop 16 is also energized from source 48 by way of switch 46, coupling circuit 52, a second normally-closed limit switch 54, and signal delay unit 56. Delay unit 56 is arranged to delay pulses supplied thereto for an interval slightly longer than it takes for counter 58 to be reset.

The circuit thus far described comprises a complete control circuit for controlling the positioning of table 42. However there is shown also in FIG. 1 additional control circuitry for automatically correlating the movement of scriber 45 with the movement of table 42. This control circuitry comprises a relay 60 which has one input terminal connected to the output of counter 58 via line 61. The other terminal of relay 60 is also energized from source 62 by way of scriber return switch 64 and contacts 66 of relay 60. Scriber return switch 64 is a normally closed limit switch which is opened momentarily each time scriber 45 reaches the limit of its excursion opposite to that which results in the operation of switch 46.

The primary function of relay 60 is to control the energization of scriber drive motor clutch solenoid 72 by way of contacts 68. A drive motor shown schematically at 91 drives scriber 45 through clutch 93 which is controlled by solenoid 72. The broken line 95 in FIG. 1 diagrammatically represents a mechanical linkage which is arranged to draw scriber 45 in a straight line across the work table 42 in order to cut a groove in wafer 78 positioned thereon, lift the scriber at the end of its cutting stroke, return scriber 45 to its initial position while still in the lifted position, and lower the scriber to perform another cutting stroke. This operation repeats cyclically as long as clutch 93 is engaged.

FIG. 2 illustrates a semiconductor wafer 78 having numerous transistors formed thereon, one within each rectangular square shown. The number of squares on an actual wafer will be far greater than depicted in FIG. 2, where the squares have been enlarged for purposes of simplification. Wafter 78 includes horizontally scribed lines 82 and vertical scribed lines 80. Only the production of the vertical lines 80 will be discussed since the horizontal lines 82 in practice are fabricated in a manner similar to the vertical lines after the wafer 78 is rotated 90°.

It is understood that, for the purposes of the scribing operation, wafer 78 will be secured to the top of table 42 by any convenient means. Lines 84 and 86 in FIG. 2 represent the positions of scriber 45 at which switches 64 and 46, respectively, are actuated. Line 88 represents the relative position of table 42 and scriber 45 at which switch 54 is actuated.

*Operation*

Before placing the system in operation control 57 of counter 58 is preset so that this circuit will provide an output after receiving a preselected number of pulses. Since the number of pulses required to actuate counter 58 will determine the amount of movement of table 42 on each cycle of operation of the system, the setting of control 57 will be dictated by the desired spacing between the scribed lines 80. In one preferred embodiment of the invention the pitch of worm screw 40 was selected so that table 42 was moved .001" for each four pulses supplied to flip-flop 18. Obviously control 57 may be calibrated either in terms of pulses required to actuate counter 58 or in inches of movement of table 42.

Once counter 58 has been adjusted to provide the proper spacing between lines 80, the scriber 45 is positioned manually one space to the left of the leftmost line 80 of FIG. 2. Switch 46 is closed momentarily to reset counter 58, removing the negative voltage from the output thereof and conditioning counter 58 to respond to received pulses. Closing of switch 46 also supplies a "set" signal to flip-flop 16 after the short delay provided by circuit 56. As mentioned above, this delay is only sufficient to permit counter 58 to be fully reset.

The signal on the SET input of flip-flop 16 causes the ENABLE input of AND gate 14 to be energized. This in turn will initiate operation of motor 36 and counter 58 by allowing pulses from doubler and shaper 12 to pass to the counter and, via flip-flops 18, 20, and 22, to the motor. At the same time as motor 36 is acting to move table 42 to the left, motor 91, acting through clutch 93, will return scriber 45 to the position at which switch 64 is opened.

If switch 64 is opened before the preselected number of pulses have been supplied to counter 58, relay 60 will be deenergized since both sources of energizing signals therefore will be absent. Opening of relay 60 will deenergize solenoid 72 and cause scriber 45 to pause in its initial position until the movement of table 42 is completed.

Upon the receipt of the preselected number of pulses from AND gate 14, a negative signal will be produced at the output of counter 58 which will reset flip-flop 16. This in turn will block further pulses to flip-flop 18 and terminate the movement of motor 36. At the same time the negative output signal of counter 58 will energize relay 60. This will cause solenoid 72 to be energized and scriber 45 to begin its travel along the leftmost line 80 of FIG. 2.

After cutting the first groove, scriber 45 will reach the position represented by line 86, and switch 46 will be closed momentarily, initiating the next cycle of operation of the system.

It should be noted that if the movement of table 42 is completed before the return of scriber 45 opens switch 64, relay 60 will not be deenergized since it will be receiving an input signal from counter 58 at the time switch 64 is open. Therefore scriber 45 will immediately start to scribe the next line 80 on wafer 78. The operation as described above will continue until movement of table 42 results in actuation of table limit switch 54. Opening of switch 54 will prevent the resetting of flip-flop 16. Thus AND gate 14 will be permanently disabled and motor 36 deenergized.

After vertical lines 80 are formed by the above described scribing operation, table 42, with wafer 78 mounted thereon, may be manually rotated through 90°. Lines 82 will be scribed in similar manner to lines 80, with the exception that switch 32 will now be thrown to the reverse position and the scribing of the lines 82 will occur from right to left on blank 78, rather than from left to right as described above.

While automatic control of the scriber 45 and table 42 by means of limit switches has been described herein, it is to be understood that other forms of controls may be substituted therefor. In a simpler form of the invention switch 46 may comprise a manually actuated switch which produces a preselected movement of table 42 each time it is closed. Also, while a two-winding synchronous motor has been described as the preferred means of practicing the invention, it is to be understood that other forms of motors which will provide a precise angular rotation for each cycle on the applied signal may be substituted for the motor 36. Similarly the invention is not limited to the wafer scribing application shown, but may be used whereever a precise rotational or linear movement is to be effected. Accordingly I desire that the scope of my invention be limited only by the appended claims and not by the specificities of the foregoing description thereof.

I claim:

1. In combination:
(a) means arranged to supply pulses,
(b) rotatable means arranged to rotate a fixed increment in response to a fixed number of said pulses,
(c) a counter arranged to count said pulses and to supply an output signal when a preset number of pulses have been transmitted to said rotatable means, and
(d) normally transmissive gating means connected between said (a) means and said rotatable means and arranged to become non-transmissive and thereby interrupt transmission of pulses from said (a) means to said rotatable means in response to said signal.

2. The combination of claim 1 where said rotatable means is a synchronous motor.

3. The combination of claim 2 where said synchronous motor drives a worm screw which is arranged to move a member in linear fashion as it turns.

4. In combination:
(a) means arranged to move a member a predetermined distance per pulse applied thereto,
(b) means for supplying pulses to said first-named means via a normally transmissive gate,
(c) means for rendering said gate non-transmissive when a predetermined number of pulses have been supplied to said first-named means.

5. The combination of claim 4 where said first named means is a synchronous motor driving a worm gear arranged to move a member in linear fashion when it turns.

6. The combination of claim 5 wherein said synchronous motor is a motor having at least two field coils therein, said pulses are supplied to a first complementing flip-flop having two outputs, the respective two outputs of said first complementing flip-flop being connected to respective inputs of similar second and third complementing flip-flops, and wherein the two outputs of said second flip-flop are connected to respective ends of one of said field coils, and the two outputs of said third complementing flip-flop are connected to the respective ends of the other of said field coils.

7. A device for indexing lines to be scribed on a semiconductor wafer comprising:
(a) a table to support said wafer,
(b) a worm screw arranged to move said table linearly as said worm rotates,
(c) a motor coupled to said worm screw, said motor arranged to rotate a fixed number of degrees in response to a fixed number of electrical pulses supplied thereto,
(d) a source of pulses and normally transmissive gating means for supplying said pulses to said motor,
(e) presettable means for counting the number of pulses supplied to said motor and transmitting a signal to said gating means to render it nontransmissive when a predetermined number of pulses have been supplied to said motor.

8. The device of claim 7 wherein said motor is a synchronous motor having two field coils; and further including to a first complementing flip-flip having an input coupled to the output of said gating means and two outputs coupled to the inputs of two further complementing flip-flops, respectively; the outputs of said two further flip-flops being coupled to said field coils via four amplifying means.

9. A system for moving a member a precise distance, comprising, in combination:
(a) the member to be moved and means for moving said member linearly in response to rotation of another member engaging said means,
(b) means for rotating said other member through a fixed angle in response to each pulse of electrical energy applied thereto,
(c) means for supplying pulses of electrical energy to said means for rotating,
(d) means for controllably transmitting or blocking said pulses to said means for rotating,
(e) bistable means arranged to render said last-named means transmissive of said pulses when said bistable means is in one of its stable states and nontransmissive when in the other of its stable states,
(f) counting means arranged to count the number of pulses supplied to said means for rotating, said countting means arranged to reset said bistable means in its other stable stable in response to the count of a predeterminable number of said pulses, and
(g) means for resetting said counter and setting said bistable means in said one of its stable states.

10. The combination of claim 9 wherein said (d) means is an AND gate having first and second imputs and an output, said first input is connected to said means for supplying pulses, said output is connected to said means for rotating and said counting means, and said second input is connected to an output of said bistable means.

11. The combination of claim 9 wherein: (1) said means for rotating comprises: (a) a synchronous motor having at least two field coils, and (b) first, second, and third symmetrically triggerable flip flops, the input of said first flip flop being connected to said means for supplying pulses, the inputs of said second and third flip flops being connected to two complementary outputs, respectively, of said first, the outputs of said second and third flip flops being arranged to drive said two field coils, respectively; and wherein (2) said means arranged to move said member comprises a worm screw.

12. In combination:
(a) a synchronous motor,
(b) a worm screw coupled to the rotating member of said motor,
(c) means coupled to said worm screw and arranged to be moved in a linear fashion in response to rotation of said worm screw, and
(d) a system for controllably driving said motor, comprising:
(1) a source of pulses,
(2) means coupling said source to said motor for translating said pulses to drive said motor,
(3) means for counting the number of pulses supplied to said means for coupling and for providing a predetermined output in response to a predeterminable mumber of said pulses, and
(4) normally transmissive gating means connected between said source and said means for coupling, for halting the flow of said pulses to said means for coupling in response to said predetermined output.

13. The combination of claim 12 wherein said means for coupling comprises first, second, and third symmetrically triggerable flip flops, said first flip flop is arranged to recieve said pulses and drive said second and third flip flops, and said second and third flip flops are arranged to drive said motor.

References Cited by the Examiner

UNITED STATES PATENTS

| | | | |
|---|---|---|---|
| 2,979,972 | 4/1961 | Danly | 318—162 |
| 2,991,403 | 7/1961 | Groft | 318—467 X |
| 3,027,703 | 4/1962 | Royle | 318—162 |
| 3,078,400 | 2/1963 | Kilroy. | |
| 3,099,777 | 4/1963 | Davis | 318—162 |
| 3,109,974 | 11/1963 | Hallmark | 318—163 |
| 3,117,268 | 1/1964 | Madsen | 318—443 |
| 3,191,111 | 6/1965 | Greene | 310—49 X |
| 3,218,535 | 11/1965 | Holthaus | 318—18 X |

ORIS L. RADER, *Primary Examiner.*

C. E. ROHRER, G. FRIEDBERG, *Assistant Examiners.*